May 12, 1931.  W. C. DUNN  1,804,405
SPRING SUSPENSION FOR VEHICLES
Filed Nov. 16, 1928   2 Sheets-Sheet 1
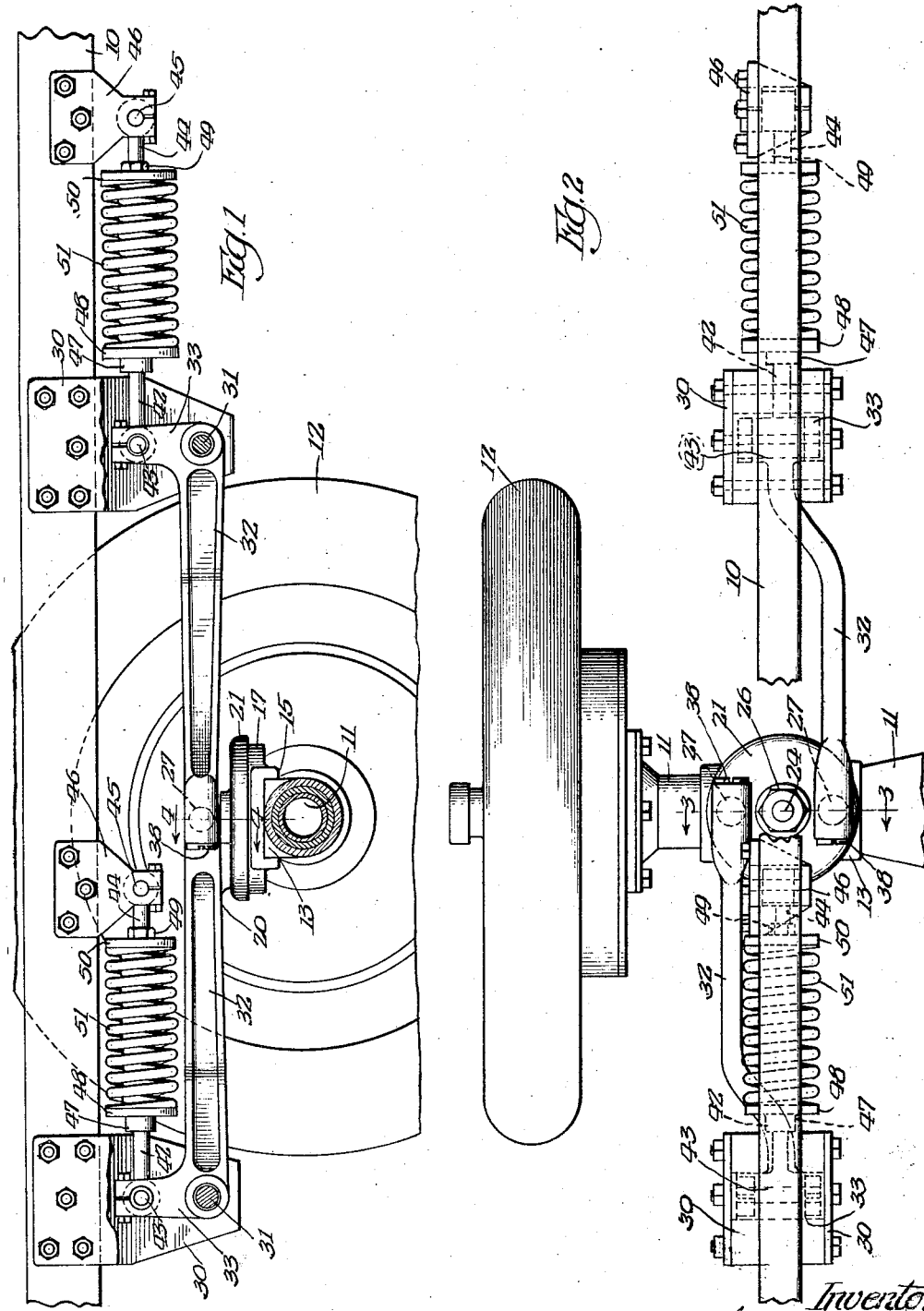
Inventor
William C. Dunn
By May 12, 1931. W. C. DUNN 1,804,405
SPRING SUSPENSION FOR VEHICLES
Filed Nov. 16, 1928 2 Sheets-Sheet 2
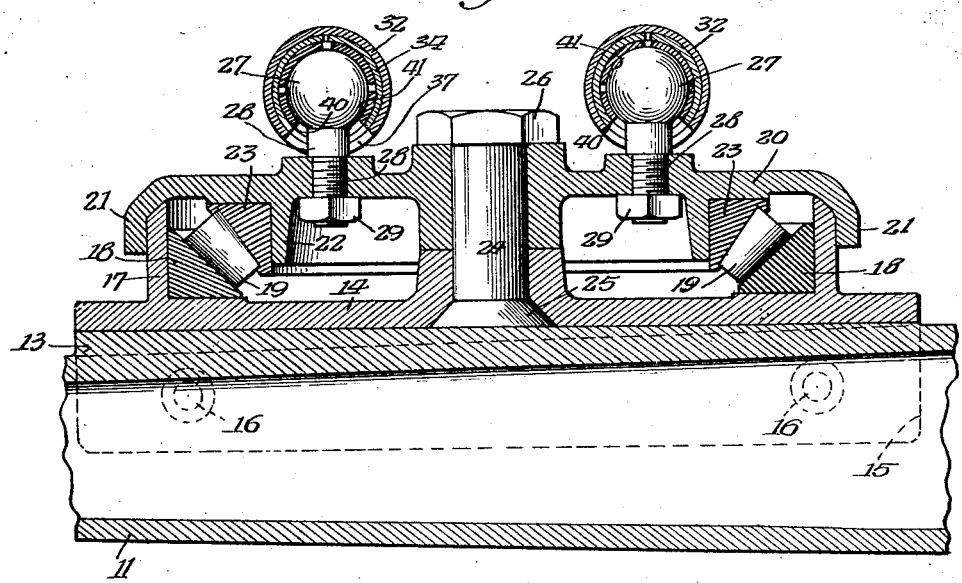
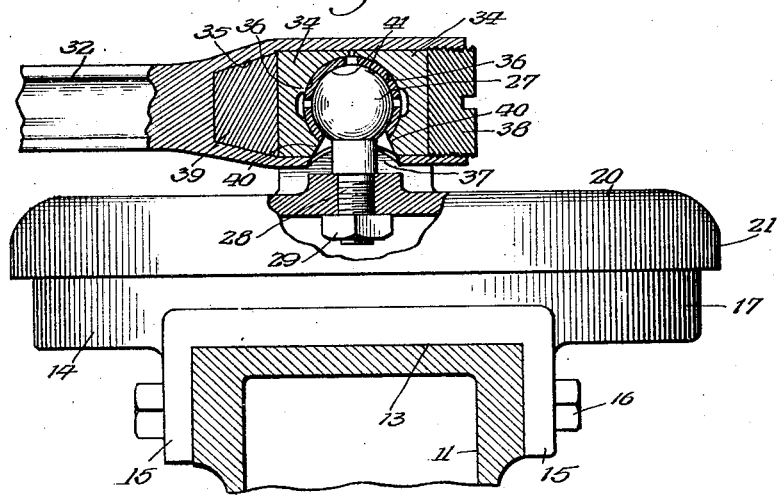
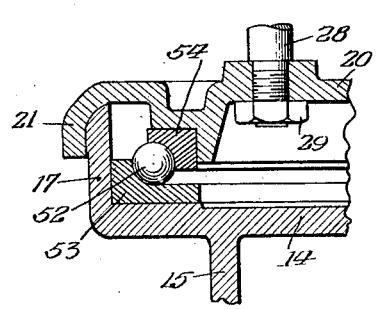
Inventor
William C. Dunn Patented May 12, 1931

1,804,405

UNITED STATES PATENT OFFICE

WILLIAM C. DUNN, OF CHICAGO, ILLINOIS

SPRING SUSPENSION FOR VEHICLES

Application filed November 16, 1928. Serial No. 319,772.

This invention relates to improvements in spring suspension for vehicles and one of the objects of the invention is to improve the riding qualities of the vehicle and eliminate a major portion of and reduce to a minimum the vertical movements due to road inequalities, a further object being to provide an improved lever and spring action whereby the vertical action which is usually transmitted to the vehicle body will be converted into a horizontal action.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view in side elevation, partly broken away and partly in section of a portion of a vehicle having a spring suspension constructed in accordance with the principles of this invention applied thereto.

Figure 2 is a top plan view of Figure 1.

Figure 3 is a detail sectional view, on an enlarged scale, taken on line 3—3, Figure 2.

Figure 4 is a detail vertical sectional view taken on line 4—4, Figure 1.

Figure 5 is a fragmentary view in section, similar to Figure 3, of a modified form of the invention.

Referring more particularly to the drawings the numeral 10 designates generally the chassis of a vehicle, 11 an axle and 12 one of the supporting wheels.

The axle 11 is provided with the usual supporting surface or pad 13 and secured to the axle so as to rest upon the surface 13 is a member comprising a body portion 14 having depending flanges 15 adapted to stand astride of the axle and is secured in position in any suitable manner such as by means of fastening bolts 16.

This member 14 is of any desired size and configuration and is provided with an upwardly projecting circumferential flange 17 circular in configuration and may be of any desired height. Arranged within the flange 17 is a bearing 18 upon which conically shaped rollers 19 rest so that the axes of the rollers will be inclined.

A member 20 co-operates with the member 14 and is provided with a depending flange 21 which extends over the flange 17. Carried by the member 20 is a depending flange 22 arranged on the lower face thereof and spaced from the flange 21. Bearing members 23 encompass and engage the flange 22 and these bearing members 23 co-operate with the bearings 18 and are also engaged by the rollers 19.

The members 14 and 20 are secured together for axial rotation one with respect to the other in any desired or suitable manner, preferably by means of a fastening bolt 24 having a head 25, the bolt passing through the members 14 and 20, the head 25 being countersunk in the member 14. A nut 26 engages the free end of the bolt 24.

Secured to the member 20 in any desired or suitable manner are spherical members 27 which are preferably provided with stems 28 that pass through the member 20 and are provided with nuts or collars 29 on the end thereof which are adjustable with respect thereto so as to secure the members 27 in position. One of these members 27 is arranged on each side of the axis of the member 20.

Mounted upon the vehicle frame and depending therebelow is a bracket 30 and pivotally supported by the bracket intermediate its ends as at 31, is a bell crank lever, one arm 32 of which is of a length considerably greater than the arm 33. The arm 32 is arranged horizontally and is provided in its free end with bearings 34 preferably disposed within a tubular portion 35 in the end of the lever 32. These bearing members are provided with semi-circular faces 36 that co-operate with each other to receive and hold the respective members 27 therebetween, the extremity of the arm 32 being provided with an opening 37 of a sufficient diameter to permit the member 27 to pass into the tubular extremity of the arm and between the semi-circular faces 36 of the co-operating members 34. A nut 38 is adjustably secured in the end of the tubular portion 35 and co-operates with the filler member 39 for holding the bearing members 34 in operative relation.

Portions of the adjacent faces of the bearing members 34 are cut away as at 40 so as not to interfere with the oscillatory motion of the arm 32 with respect to the member 14.

If desired, a bushing 41 may be provided on the faces 36 of the bearing members 34.

To the other arm 33 of the bell crank lever, and which latter arm is arranged vertically, a link 42 is pivotally connected as at 43. Another link 44 is pivotally connected as at 45 with a bracket 46 on the frame member 10. The links 42 and 44 preferably telescope and a collar 47, against which a bearing member 48 rests, is provided on the link 42. An adjustable collar 49 is provided on the link 44 and a bearing member 50 rests against the collar 49. A coil spring 51 encompasses the telescoping portion of the links 42 and 44, one end of the spring engaging the bearing member 48 and the other end engaging the bearing member 50. Thus it will be seen that when the bell crank lever is rocked about its pivot 31 its rocking movement will be yieldingly resisted by the spring 50, the stress or tension of the spring 50 being adapted to be varied by the adjustment of the nut or collar 49 on the link 44.

One pair of each of these bell crank levers together with the resiliently yielding resistance creating means is provided adjacent each of the wheels of the axle and the forward ends of the respective arms 32 engage the projecting members 27 on opposite sides and preferably diametrically opposite to each other, of the vertical axis of the member 20.

With this improved construction it will be manifest that when the vehicle frame and the axle 11 are moved toward and away from each other a rocking movement will be imparted to the bell crank levers about the horizontal axes 31 and this rocking movement will be yieldingly resisted by the resilient elements 51. When the axle is rocked in a direction lengthwise of its axis, it will be manifest that there will be a relative rocking movement between the member 20 and the end of the arm 32. The connection between the end of the arm 32 and the member 20 will form a ball and socket joint adapted for universal rocking movement by reason of the fact that there is a universal joint connection between the axle and the end of the arm 32 of the bell crank lever.

Thus it will be seen that the vertical movement of the vehicle body will, through the medium of this spring suspension, be converted into a horizontal movement without binding the parts.

In the form of the invention shown in Figure 5, the roller bearings 19 are dispensed with and ball bearings 52 are employed in lieu thereof, the bearing members 53 and 54 corresponding respectively to the bearing members 18 and 23 being provided to accommodate the ball bearings.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. In a suspension for vehicles, the combination of a bracket supported by the vehicle, a bell crank lever fulcrumed at its elbow on said bracket and having an upwardly extending arm and a horizontally extending arm, resiliently yielding means disposed between the first recited arm and the vehicle frame for yieldingly resisting the movement of said lever, the forward end of said horizontal arm being disposed adjacent an axle of the vehicle, a member connected with said axle for movement on a vertical axis, and means connecting the end of said horizontal arm with the said member at a point laterally spaced with respect to the axis of said member for movement on an axis intersecting the last said axis.

2. In a suspension for vehicles, the combination of a bracket supported by the vehicle, a bell crank lever fulcrumed at its elbow on said bracket and having an upwardly extending arm and a horizontally extending arm, resiliently yielding means disposed between the first recited arm and the vehicle frame for yieldingly resisting the movement of said lever, the forward end of said horizontal arm being disposed adjacent an axle of the vehicle, a member connected with said axle for movement on a vertical axis, and a ball and socket joint connection between said member and the said end of the horizontal arm, the last said connection being laterally spaced with respect to the said vertical axis of said member.

3. In a suspension for vehicles, the combination of a bracket supported by the vehicle, a bell crank lever fulcrumed at its elbow on said bracket and having an upwardly extending arm and a horizontally extending arm, resiliently yielding means disposed between the first recited arm and the vehicle frame for yieldingly resisting the movement of said lever, the forward end of said horizontal arm being disposed adjacent an axle of the vehicle, a member connected with an axle of the vehicle, a second member connected with the first said member for rotation with respect thereto and on a vertical axis, roller bearings between said members, and means connecting the end of said horizontal arm with the said second member and to one side of the axis of the last said member for movement on an axis intersecting the last said axis.

4. In a suspension for vehicles, the combination of a bracket supported by the vehicle, a bell crank lever fulcrumed at its elbow on said bracket and having an upwardly extending arm and a horizontally extending arm, resiliently yielding means disposed between the first recited arm and the vehicle frame for yieldingly resisting the movement of said lever, the forward end of said horizontal arm being disposed adjacent an axle of the vehicle, a member connected with an axle of the vehicle, a second member connected with the first said member for rotation with respect thereto and on a vertical axis, roller bearings between said members, and a ball and socket joint connection between said end of the horizontal arm and the said second member and to one side of the axis of said member.

5. In a suspension for vehicles the combination of two bell crank levers each pivotally supported at their elbows, each of said levers being provided with an upwardly extending arm, resiliently yielding means individual to said arms and disposed between the vehicle frame and the respective arms, said levers each having a horizontal arm, said horizontal arms extending towards each other and being laterally spaced, the extremities of both of said horizontal arms being disposed adjacent an axle of the vehicle, a member connected with the said axle for movement about a vertical axis, and means connecting the said member with the respective ends of the said horizontal arms, on opposite sides of said axis, whereby said member and said arms are capable of relative pivotal movement on axes intersecting the first said axis.

6. In a suspension for vehicles the combination of two bell crank levers each pivotally supported at their elbows, each of said levers being provided with an upwardly extending arm, resiliently yielding means individual to said arms and disposed between the vehicle frame and the respective arms, said levers each having a horizontal arm, said horizontal arms extending towards each other and being laterally spaced, the extremities of both of said horizontal arms being disposed adjacent an axle of the vehicle, a member connected with the said axle for movement about a vertical axis, and ball and socket joints individual to and forming connection between the said ends of said horizontal arms and said member.

7. In a suspension for vehicles, the combination of a bracket supported by the vehicle, a bell crank lever fulcrumed at its elbow on said bracket and having an upwardly extending arm and a horizontally extending arm, resiliently yielding means disposed between the first recited arm and the vehicle frame for yieldingly resisting the movement of said lever, the forward end of said horizontal arm being disposed adjacent an axle of the vehicle, a member connected with said axle for movement on a vertical axis, a roller bearing for said member, and means connecting the end of said horizontal arm with the said member and to one side of the axis of said member for movement on an axis intersecting the last said axis.

8. In a suspension for vehicles the combination of two bell crank levers each pivotally supported at their elbows, each of said levers being provided with an upwardly extending arm, resiliently yielding means individual to said arms and disposed between the vehicle frame and the respective arms, said levers each having a horizontal arm, said horizontal arms extending towards each other and being laterally spaced, the extremities of both of said horizontal arms being disposed adjacent an axle of the vehicle, a member connected with the said axle for movement about a vertical axis, a roller bearing for said member, and means connecting the said member with the respective ends of the said horizontal arms, on opposite sides of said axis, whereby said member and said arms are capable of relative pivotal movement on axes intersecting the first said axis.

9. In a suspension for vehicles, the combination with a bell crank lever pivotally mounted at its elbow upon the vehicle and having a vertical arm, means forming a connection between said arm and the vehicle for yieldingly resisting the movement of said lever about its pivot, said lever having a horizontally extending arm the free end of which is disposed adjacent an axle of the vehicle, a member connected with the axle for oscillation about a vertical axis, said member and said horizontal arm being provided, one with a spherical projection and the other with a socket within which the said projection is seated, to form a connection between said arm and said member laterally spaced with respect to the axis of said member, said lever arm and said member being adapted for universal movement one with relation to the other.

10. In a suspension for vehicles, the combination with a bell crank lever pivotally mounted at its elbow upon the vehicle and having a vertical arm, means forming a connection between said arm and the vehicle for yieldingly resisting the movement of said lever about its pivot, said lever having a horizontally extending arm, the free end of which is disposed adjacent an axle of the vehicle, a member connected with the axle for oscillation about a vertical axis, a spherical projection extending from said member, the end of said horizontal arm being tubular and into which said projection extends, and bearings within the tubular portion of said arm and encompassing said projection.

11. In a suspension for vehicles, the combination with a bell crank lever pivotally mounted at its elbow upon the vehicle and having a vertical arm, means forming a connection between said arm and the vehicle for yieldingly resisting the movement of said lever about its pivot, said lever having a horizontally extending arm the free end of which is disposed adjacent an axle of the vehicle, a member connected with the axle for oscillation about a vertical axis, a spherical projection extending from said member, a portion of said horizontal arm being hollow and having a lateral opening through the arm and through which opening said projection extends into the arm, bearing members within said hollow portion and engaging said spherical projection, and means for maintaining said bearing members in position.

12. In a suspension for vehicles, a pair of bell crank levers pivotally mounted at their elbows for movements on horizontal axes, each of said levers having a vertical arm, means individual to said arms for yieldingly resisting the movements of the respective arms about their pivots, a member connected with an axle of the vehicle for movement on an upright axis, the ends of said horizontal arms being spaced laterally from each other and each terminating adjacent said member, and ball and socket joint connections between said member and the respective lever arm, said connections being disposed on opposite sides of the pivot of said member, whereby when said levers are rocked about their horizontal pivots said member will be oscillated about its upright axis.

13. In a suspension for vehicles, a pair of bell crank levers pivotally mounted at their elbows for movements on horizontal axes, each of said levers having a vertical arm, means individual to said arms for yieldingly resisting the movements of the respective arms about their pivots, a member connected with an axle of the vehicle for movement on an upright axis, the ends of said horizontal arms being spaced laterally from each other and each terminating adjacent said member, ball and socket joint connections between said member and the respective lever arm, said connections being disposed on opposite sides of the pivot of said member, whereby when said levers are rocked about their horizontal pivots said member will be oscillated about its upright axis, and roller bearings for said member.

In testimony whereof I have signed my name to this specification, on this 2nd day of November, A. D. 1928.

WILLIAM C. DUNN.